United States Patent [19]

Ohlson

[11] Patent Number: 4,675,894
[45] Date of Patent: Jun. 23, 1987

[54] METHOD OF CENTERING AN X-RAY FILM CASSETTE OR LIKE OBJECT INSERTED IN A HOLDER, IN RESPECT TO AN X-AXIS IN WHICH THE CASSETTE CAN BE SO CENTERED

[76] Inventor: Carl-Eric Ohlson, Vintervägen 25, S-171 34 Solna, Sweden

[21] Appl. No.: 655,443

[22] Filed: Sep. 28, 1984

[30] Foreign Application Priority Data

Aug. 10, 1984 [SE] Sweden .............................. 8404067

[51] Int. Cl.⁴ ............................................. H05G 1/00
[52] U.S. Cl. ..................................... 378/181; 378/182
[58] Field of Search ................ 378/181, 176, 175, 182

[56] References Cited

U.S. PATENT DOCUMENTS

| | | | |
|---|---|---|---|
| 4,128,767 | 12/1978 | Stödberg et al. | 250/513 |
| 4,246,488 | 1/1981 | Hura | 250/513 |
| 4,426,724 | 1/1984 | Cutter | 378/181 |
| 4,538,293 | 8/1985 | Cutter | 378/181 |

FOREIGN PATENT DOCUMENTS 0068212 1/1983 European Pat. Off.
1358660 7/1974 United Kingdom.

OTHER PUBLICATIONS

Japanese Patent Abstract, vol. 7, No. 146P206, for Cassette Holder, Japanese Pat. No. 58-57127, published 5/4/83.

*Primary Examiner*—Carolyn E. Fields
*Attorney, Agent, or Firm*—Fleit, Jacobson, Cohn & Price

[57] ABSTRACT

A "Potter-box" (1) has a holder or Potter-spade (2) provided with dogging means (5, 6) for centering an X-ray film cassette, or some other X-ray radiation receiver, in the direction of an X-axis and a Y-axis. Movement of the holder between a cassette-change position and a film-exposure position and vice versa, is utilized to drive the dogging means (5, 6) directly via a link system, so as to center or decenter the cassette, thereby rendering the provision of separate operating means for effecting centering or decentering of the cassette unnecessary.

7 Claims, 17 Drawing Figures

METHOD OF CENTERING AN X-RAY FILM CASSETTE OR LIKE OBJECT INSERTED IN A HOLDER, IN RESPECT TO AN X-AXIS IN WHICH THE CASSETTE CAN BE SO CENTERED

TECHNICAL FIELD

The present invention relates to a method of centering an X-ray cassette or like receiver of X-ray radiation inserted in a holder, with respect to an X-axis and Y-axis, in which the holder can be moved along or pivoted about an axis backwards and forwards between two terminal positions, namely a position in which change of cassette or receiver can take place, and a position in which the cassette or like receiver can be exposed to X-ray radiation.

The invention also relates to a holder—often referred to as a "Potter spade"—for housing an X-ray film cassette or a like receiver of X-radiation and in which the cassette can be centered about said X and Y axes, the holder being arranged for movement between two terminal positions relative to a frame part of the holder, either by displacement along or pivotal movement about an axis. The assembly which comprises the aforesaid holder and frame part is often referred to as a "Potter box", a "Bucky box" or a "Potter-Bucky-box", and will be referred to hereinafter as a "Potter box".

Such assemblies or Potter boxes are often placed beneath a table on which a patient to be X-rayed is positioned, and the holder or "spade" is displaced in the horizontal plane to a cassette-exchange position, by the side of the table. When taking X-ray pictures of the lungs or chest of a patient, the Potter box is normally located in the vertical plane instead, in which case the holder or spade is moved vertically to a position on one side of the patient, where a change of cassettes takes place.

In other types of X-ray apparatus, the holder is pivotally mounted and—similar to various types of axially displaceable, existing holders—can be swung relative to a Potter box, which may be located in the horizontal or vertical plane and which can be moved to different angular positions relative to the horizontal plane.

BACKGROUND ART

Subsequent to inserting an X-ray film cassette into the holder in the cassette-changing position, the cassette must be centered in the direction of the X and Y axes. This centering of the cassette is encumbered with certain difficulties, due to the fact that cassettes of mutually different sizes are required for photographing different parts of the body. These cassettes normally occur in at least nine different standard dimensions, both in centimetres and in imperial inches.

The cassettes are normally centered through the agency of separate dogging or centering means, which are normally arranged in pairs, i.e. two dogging means are arranged to centre the cassette in the X-direction and two in the Y-direction.

The dogging means are normally moved by a link-mechanism forming part of a separate auxiliary operating device carried by the holder.

Great Britian patent application No. 1 358 660 (Philips Electronic) describes a cassette holder which can be swung relative to a box and which is provided with one such auxiliary device in the form of a handle.

Other similar solutions with corresponding disadvantages are described in, for example, U.S. Pat. No. 4,128,767 (Stödberg et al), European patent application No. 0068212 (Siemens) and U.S. Pat. No. 4,246,488 (Hura).

Japan patent application No. 58-57127 (Seisakusho et al) describes a different arrangement, in which a cassette is centered only in the X-direction or in the Y-direction when inserted in the actual holder.

OBJECT OF THE INVENTION

An object of the present invention is to provide such a method in which the manual work required of the person operating the X-ray equipment is greatly simplified when changing and centering cassettes.

Another object of the invention is to provide a holder for an X-ray film cassette or like receiver of X-radiation which is provided with dogs or centering means for positioning a cassette in the X and Y directions; which is of robust and reliable design; which simplifies the work involved in changing and centering a cassette; which enables the cassette to be centered in a more reliable fashion; and which prevents the risk of exposure in the event of a wrongly centered cassette or in the absence of a cassette, so as to avoid the necessity of a re-take and to safeguard the patient against exposure to unnecessarily high dosages of radiation.

BRIEF DISCLOSURE OF THE INVENTION

In its widest aspect the invention is mainly characterized in that the movement executed by the holder when changing a cassette or like X-radiation receiver is utilized to automatically decenter or center the cassette in both the X and the Y direction, said decentering movement releasing the cassette, so that it can be changed for another cassette.

The invention enables a cassette or like X-radiation receiver to be decentered or centered in conjunction with a cassette change, without requiring the operator to manipulate any particular auxiliary manipulating means. Instead, the cassette is freed as a result of moving the holder to the cassette-change position, in which the cassette can be readily grasped and replaced with a further cassette, which is automatically centered as a result of moving the holder to the film-exposure position.

The invention affords particular advantages in conjunction with known cassette holders with which, when changing a cassette, special buttons or keys must be manipulated in accordance with the dimensions of the replacement cassette.

When carrying out the method in practice, it is preferred that the cassette is centered, or moved out of centre, during one part of the movement of the holder from one terminal position towards the other terminal position, and that a further part of the movement of the holder towards said other terminal position is effected under a changed state of one or more means by which said movement is transmitted to the cassette dogging or centering means.

In this way, the centering or decentering operations can be carried out automatically with cassettes of mutually different dimensions with the aid of simple link-mechanisms which transfer the movements of the holder to the cassette dogging or centering means.

The change in state of the aforesaid means takes place at that instant when the dogs commence a decentering operation and complete a centering operation in the X and Y directions, these instants thus varying in response to the dimensions of the cassette in question in said directions.

Expressed in another way, the dogs intended, for example, for centering the cassette in the direction of the Y-axis may have terminated their centering movement during part of the movement of the holder to the filmexposure position, wherewith the changed movement-state then occurs for corresponding movement-transfer means, while only immediately thereafter—when the holder has moved further towards the film-exposure position—is centering of the cassette completed and a changed movement state or movement style has occurred in respect of the movement-transfer means acted upon by the cassette during its centering movement in the direction of the X-axes.

The changed state of movement of the means in question upon continued movement of the holder to the film-exposure position can have many different forms, irrespective of the structural design chosen.

For example, the continued movement of the holder can be taken-up from the centering position by:
(a) an abutment means or holding means which is locked alternately to a stationarily mounted guide bar and to a movable guide bar;
(b) a guide bush provided with snap-in locking means and arranged so that the friction against the guide bar or slide rod can be adjusted;
(c) similar to (b) but with a coil spring of given spring force placed around the guide bar or rod;
(d) a gas-spring arrangement of given spring force; or
(e) a torsion spring or spiral spring located centrally in the holder and acting upon the link mechanism.

Upon movement of the holder in the opposite direction, i.e. from the cassette centering position towards the cassette change position, there is a corresponding change in the state of movement of the pertinent means at exactly the same location as that upon movement to the filmexposure position. In this instance, however, the pertinent dogging means instead effect at said location movements of the cassette from the centered position to the decentered position, thereby completing the decentering movement, so that when the holder has reached the cassette-change position, the cassette can be readily removed.

The cassette can be decentered in the direction of the X and/or the Y axes, so that a corresponding side, or sides, of the cassette, upon subsequent movement to the centered position, can be placed at a given distance from a given reference point or line.

For example, when taking lung X-rays, it is important that the distance between the chin-support and the upper horizontal side of the cassette is constant.

The cassette can be decentered in any one of the following ways, which are mentioned solely by way of examples:
(a) by locating an intermediate plate or insert of optional height or thickness between a selected dogging means and the cassette;
(b) by providing the dogging means with means which enable them to be locked to the holder, wherewith a selected link arm or selected link arms can be disengaged and the set decentering read-off on a scale placed adjacent each dogging means on the holder;
(c) by making the link arms adjustable in the direction of their longitudinal axes, along a scale provided therefor.

In addition, when applying the method, energy can be stored, if desired, during at least a part of the movement of the holder towards one of said terminal positions, and this energy later used to facilitate movement of the holder in the opposite direction.

These methods can be applied in particular when the operator is able to exert a greater force for movement of the cassette in one direction than for movement in the opposite direction.

To this end there can be used, for example, a separate draw-spring or gas spring which will store energy as the cassette moves to the film-exposure positions or to the cassette-change position, and which will release this energy upon movement of the holder in the opposite direction. In both cases, it is assumed that a snap-catch or locking means is provided which is capable of temporarily latching the holder in each of said terminal positions while film is being exposed or a cassette changed.

For reasons of expediency and comfort, at least the major part of the holder movement in either direction should be as free as possible.

In order to avoid unnecessary wear on the equipment and on the cassettes, however, it is preferred to restrict the movement of respective cassettes during, for example, the whole of their travel or a part thereof, such as movement in one or both terminal positions, or to effect the movement of the cassette in two stages, in which case travel between the two terminal positions is effected more rapidly than the remainder of the travel. This restriction in cassette movement can be effected, for example, by passing a controlled flow of air between two containers separated by a regulator valve or by some other means. In practice, the cassette is preferably centered by means of at least four pairs of mutually opposing dogging means provided with micro-switches, preferably connected in series, for blocking exposure in the absence of a cassette or when a cassette is centered unsatisfactorily, this micro-switch circuit preferably incorporating a further micro-switch for blocking exposure until the holder has reached its terminal exposure position.

Double exposures can be avoided by causing the aforesaid micro-switches to co-act with a further switch placed in the plane of the holder for the abutment surface of the cassette at a distance from the centre of the holder which is shorter than the smallest cassette, and by providing a relay arranged to block a further exposure of the same X-ray film until the micro-switch in the plane of the holder has been deactivated.

This will prevent unnecessary exposures being made and will also protect the patient from unnecessary, additional dosages of radiation.

When applying the invention, the holder is normally moved between its two terminal positions manually, although the return movement of the holder can be effected automatically, as before described, by utilizing the aforesaid stored energy. The invention can also be applied, however, when moving the holder between the two terminal positions by means of electric motors or the like. In this case, subsequent to placing the cassette in the holder the operator need only manipulate a switch, whereupon the holder is driven by the motor and the cassette centered or decentered simultaneously therewith.

Alternatively, or in addition hereto, the holder can be driven electrically with the aid of motors coupled with automatic drive means. Thus, an arrangement can be provided with which when a cassette is inserted into the holder a micro-switch co-acting with the abutment surface of the cassette in the plane of the holder is activated to cause the holder to move to the filmexposure position. This movement of the holder can be initiated, in a known manner, after a given delay time has lapsed.

Subsequent to exposing the film, the holder can be automatically returned to its other terminal position, by the electric motor, and the cassette changed.

In order to protect the various motor-drive components, one or more micro-switches may be arranged to block the electric motor if the movement of the holder is impeded in one or the other direction. One end of the holder may also be sprung.

The invention also relates to a holder for X-ray film cassettes intended for use when practising the aforedescribed method.

An assembly comprising a Potter-box provided with a holder or "Potter-spade" according to the invention can be retailed separately of remaining X-ray equipment. For example, it is a relatively simple matter in X-ray equipment to remove the assembly previously relied upon and to replace this assembly with an assembly constructed in accordance with the invention. This would greatly simplify the tasks of the operator while the general pattern of movements effected when changing a cassette remains substantially the same, i.e. the major features of the movements are the same as before while the work associated therewith is made easier while achieving a higher degree of safety in the aforementioned respects.

This compatibility with existing Potter-boxes is achieved in that the outer dimensions of a box having a holder according to the invention are smaller than or equal to the smallest existing Potter-box, it being unnecessary to adjust remaining equipment when incorporating a box according to the invention.

A number of embodiments of the invention will now be described in more detail with reference to the accompanying drawings.

BRIEF DESCRIPTION OF THE DRAWINGS

Finally.

DETAILED DESCRIPTION

Figure 1:
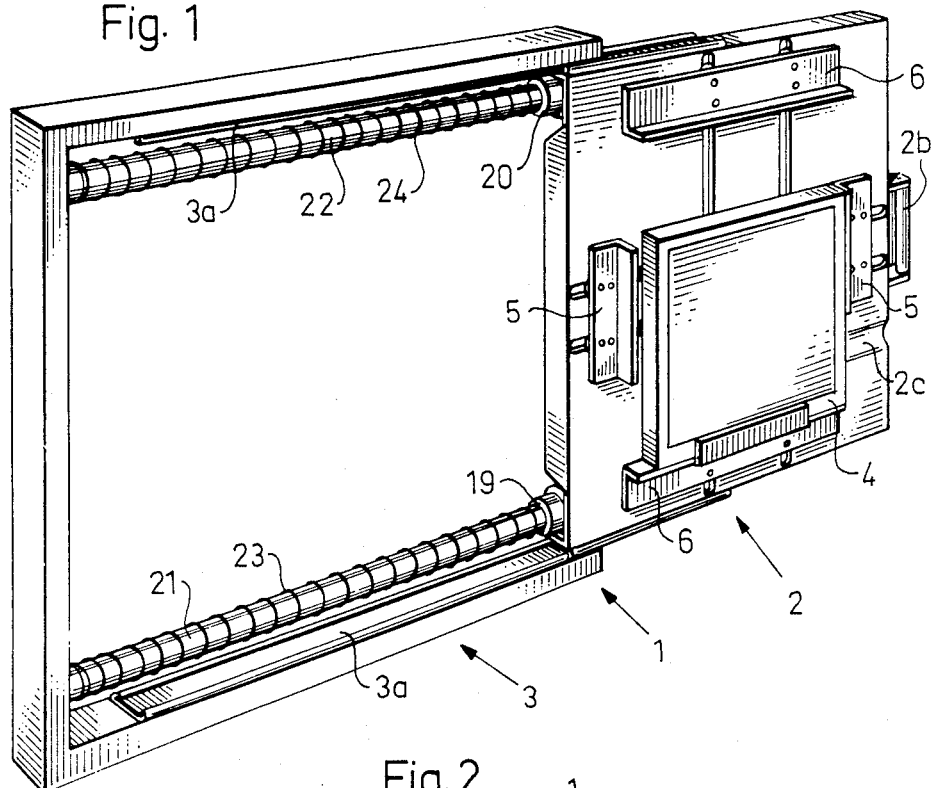
FIG. 1 is a perspective front view of a Potter-box provided with a holder or Potter-spade according to the invention.

In the figures, corresponding elements have been identified with the same references.

Referring first to FIGS. 1-5, the reference 1 identifies an assembly in the form of a displaceable holder or Potter-spade 2 provided with a Potter-box, the fixed part of which comprises a frame 3. The frame is provided with guides 3a for guiding movement of the holder 2 between a cassette-change position, shown in FIG. 1 and FIG. 2, in which a cassette 4 containing an exposed X-ray film is changed for a further cassette containing an unexposed X-ray film, and a film-exposure position shown in FIG. 4.

The holder is provided with a handle 2b and dogging means or centering means arranged in pairs, namely two dogging means 5 for centering the film cassette 4 in the direction of the X-axes and two dogging means 6 arranged to center the cassette in the direction of the Y-axes.

The dogging means are movable on rollers 5a, 6a in guide slots 7 and 8 respectively provided in the holder 2, the slots 7 forming right angles with the slots 8.

On the front side of the holder, each dogging means is provided with an angled-profile element and on the rear side of the holder with a plate-like element which is held connected by the shafts 5b of said rollers.

The dogging means 5 are connected together in pairs by means of a link mechanism comprising a central link 11 which is pivotable relative to a pivot 2a extending through the centre point of the holder 2 and which extends between a roller 9 mounted on said pivot and a drive arm 15, to which the link 11 is connected. Pivotally mounted on each end of the link 11 is a respective link 13, which, in turn, is pivotally connected to one of the dogging means 5.

The dogging means 6 co-act with a corresponding link assembly, this link assembly comprising a central link 12, a central roller 10, a drive arm 16 and links 14 connecting respective dogging means 6.

The drive arms 15 and 16 are each connected, through a respective drive link 17 and 18, with a bush 19 and 20 respectively, provided with a ball snap-in means (not shown) by means of which the bush can be detachably connected to a rod-like guide 21 and 22 respectively, extending parallel with the direction of movement of the holder 2 and anchored in mutually opposite ends of the frame part 3.

Figure 2:
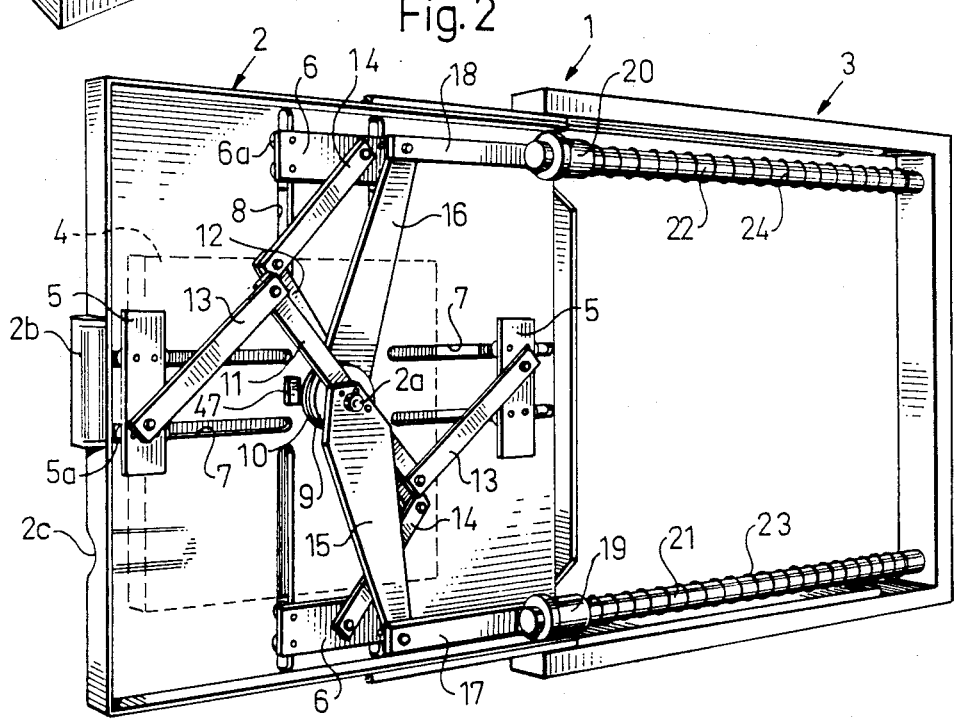
FIG. 2 is a corresponding perspective rear view of the holder or spade in the same position as that shown in FIG. 1.
Figure 4:
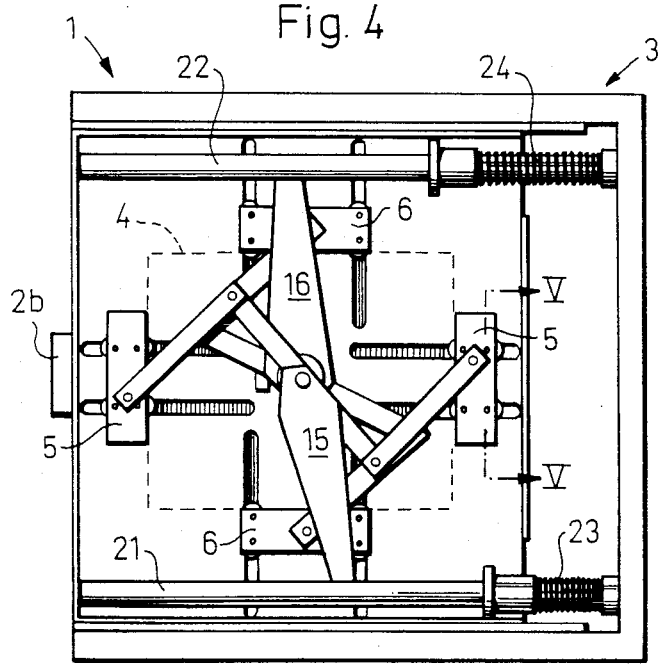
FIG. 4 is a view corresponding to FIG. 3, illustrating the holder in its film-exposure position.
Figure 5:
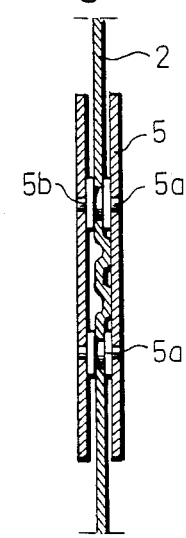
FIG. 5 is a sectional view taken on the line V—V in FIG. 4.

When the holder is moved from the cassette-change position illustrated in FIGS. 1 and 2 to the film-exposure position illustrated in FIG. 4, the ball snap-in means initially hold the bushing 19 and 20 in the terminal position on guides 21 and 22 illustrated in FIG. 2, which means that the drive link 15 and 16 will execute a pivoting movement which is transmitted to the dogging means 5 and 6, via the link systems or assemblies 11, 13 and 12, 14 respectively.

Centering of the cassette by means of the dogging means thus commences, whereupon the dogging means 5 shown to the left in FIG. 2 moves the cassette to the right, in a direction towards the other dogging means 5, at the same time as the lower dogging means 6 in the same Figure lifts the cassette upwards, towards the upper dogging means.

When the right-hand dogging means 5 engages the cassette, subsequent to a certain amount of movement, the cassette is centered in the X-direction, the driving arm 15 being unable to pivot further when the holder is displaced. Part of the displacement force is, instead, transmitted via the drive arm 15 and the drive link 17 to the guide bush 19, the ball snap-in means (not shown) of which snaps out of engagement with the guide 21 and begins to move along the same.

Figure 3:
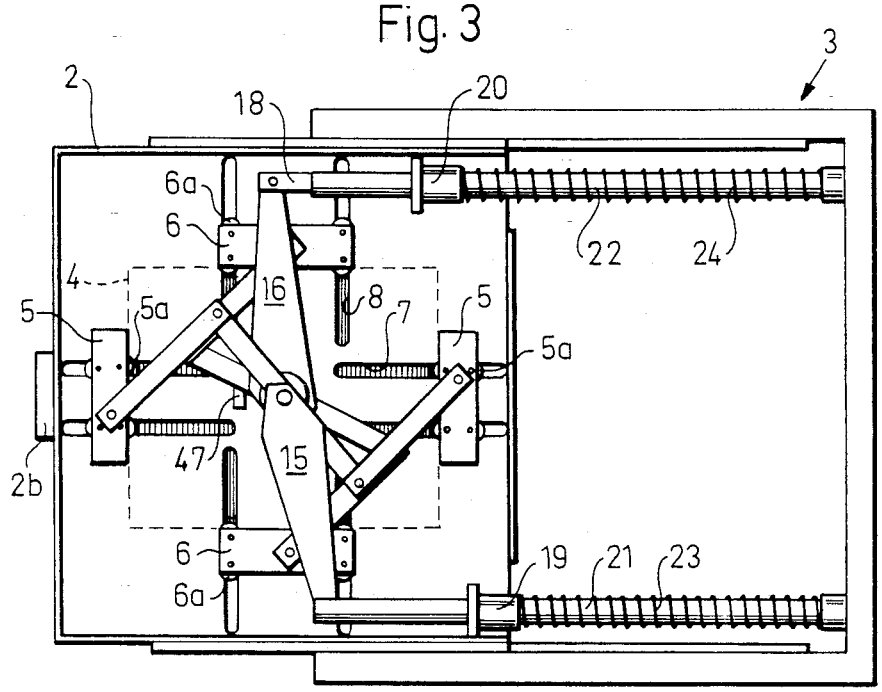
FIG. 3 is a rear view of the holder in a position in which the dogging means have earlier completed their centering movement in the X-direction and the dogging means in the Y-direction have just completed centering of an inserted film cassette.

Subsequent to further given displacement of the holder, the position illustrated in FIG. 3 is reached, in which the two dogging means 6 for centering the cassette in the Y-direction have moved to such an extent that the upper dogging means 6 engages the cassette.

In conjunction herewith the ball snap-in means of the upper guide bush 20 is also released, and the guide bush begins to move along the upper guide 22, while the drive link 18 and the drive arm 16 remain in their respective positions relative to the holder 2.

FIG. 4 illustrates the position occupied by the various components when the holder has reached the terminal position of said displacement movement, i.e. the film-exposure position. During this movement energy has been stored in the two springs 23 and 24, and can be used, subsequent to exposing the X-ray film contained in the cassette 4, to facilitate the return movement of the holder towards the cassette-change position.

When the holder is moved in the opposite direction, the described sequence of movements and events take place in reverse order. Thus, in the FIG. 3 position the ball snap-in means of the guide bush 20 is again caused to engage the rod 22, whereupon further movement of the holder causes the dogging means 6 to begin to move away from each other, whereupon the cassette, under the influence of gravity, accompanies the movement of the lower dogging means 6, thereby decentering the cassette.

The ball snap-in means of the guide bush 19 then engage the guide 21, whereupon the dogging means 5 also begin to move apart. Finally, the position illustrates in FIGS. 1 and 2 is reached, where a cassette-change can take place and the sequence repeated with a new cassette containing unexposed film located in the holder.

It will be understood that the guide bushes 19 and 20 provided with ball snap-in means can be replaced with other corresponding means, for example means of the aforegiven principle kind. One such conceivable alternative arrangement is illustrated in FIGS. 6-12. The dogging means, the link mechanisms co-acting therewith, the drive arms 15 and 16 and the drive links 17 and 18 are substantially of the kind described above with reference to FIGS. 1-5, and consequently the various components have been identified with the same reference numerals and will not be described in detail here.

In the embodiment shown in FIGS. 6-12, however, the guide bushes 19 and 20 and associated guides 21 and 22 have been replaced with abutments or holding means 19' and 20' respectively arranged to alternately lock against a stationary guide bar 21' and 22' respectively and a movable guide bar 25 and 26 respectively which accompanies the holder.

Figure 7:
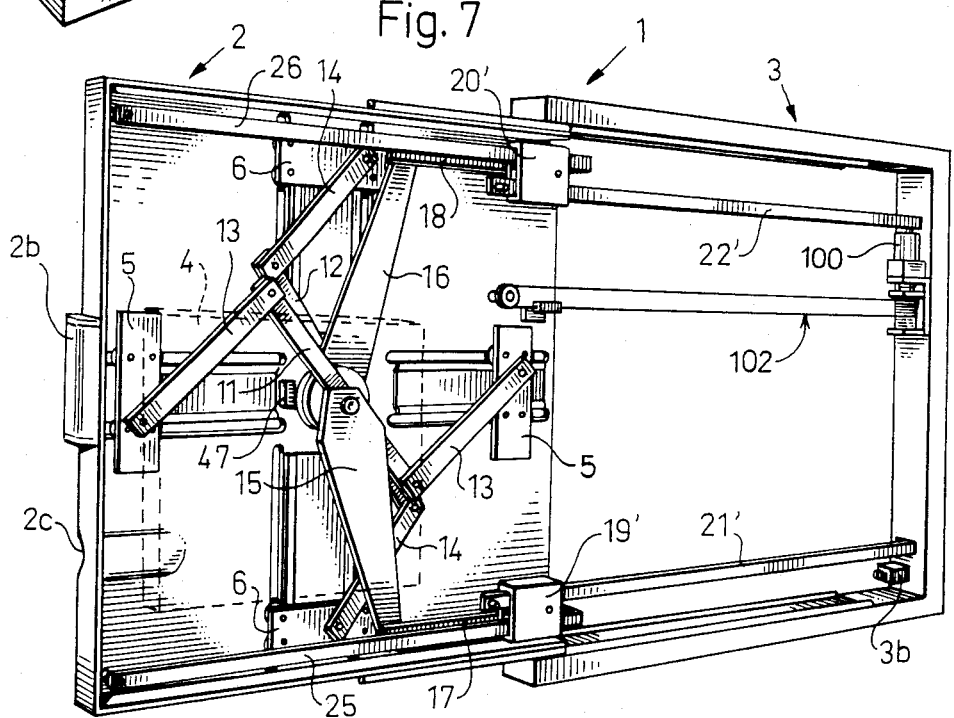
FIG. 7 is a corresponding perspective rear view of the embodiment illustrated in FIG. 6.

FIG. 7 also shows motor 100 attached to frame 3 and linear drive mechanism 102 attached to holder 2. The motor is driven to move holder 2 with respect to the frame upon receipt of the appropriate control as described earlier in the Brief Disclosure of the Invention.

Figure 8:
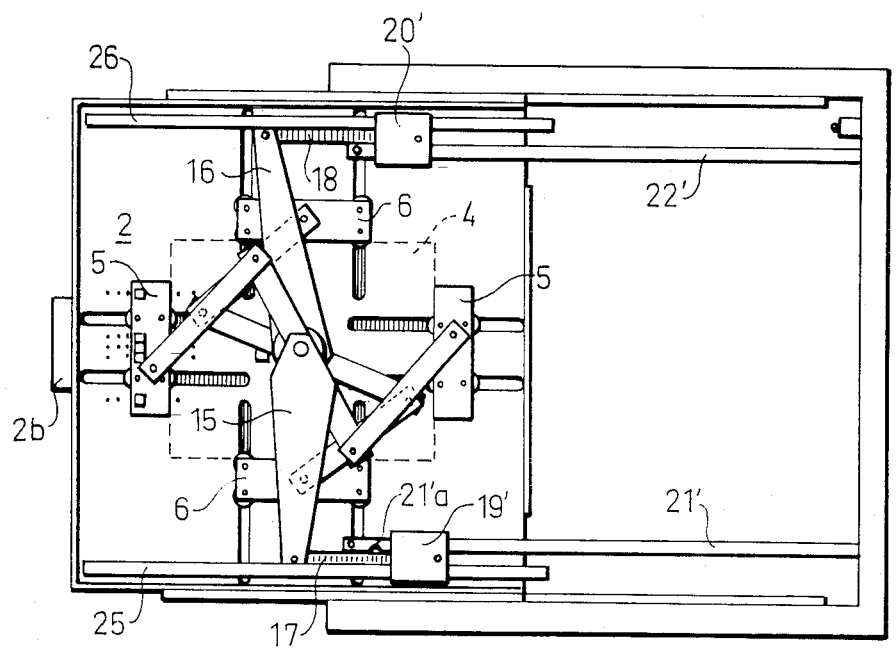
FIG. 8 is a rear view of the embodiment illustrated in FIGS. 6 and 7, illustrating the holder in the position in which the dogging means for centering the cassette in the X-direction have earlier completed the centering movement and the dogging means for centering the cassette in the Y-direction have just completed the centering movement.

FIG. 8 illustrates a position of the components which corresponds to that illustrated in FIG. 3 in respect of the embodiment first described, i.e. a position in which the upper dogging means 6 for centering the cassette in the Y-direction has begun to engage the cassette 4, whereupon none of the dogging means 6 is able to execute further centering movement. Upon continued movement of the holder towards the film-exposure position, the holding means 20' is moved out of engagement with the stationary guide bar 22'—in the same manner as that previously occurring in respect of the engagement of the holding means 19' with the guide bar 21'—and the holding means 19' is, instead, joined with the guide bar 26 carried by the holder 2, so that the holding means continues to move on the guide bar 22', while the drive link 18 and the drive arm 16 remain in their adopted position relative to the holder 2 illustrated in FIGS. 8 and 9.

Figure 10:
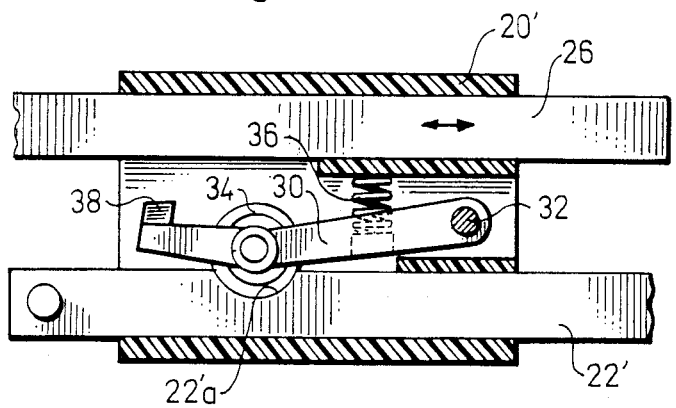
FIGS. 10-12 illustrate elements of the embodiments shown in FIGS. 6-9.
Figure 11:
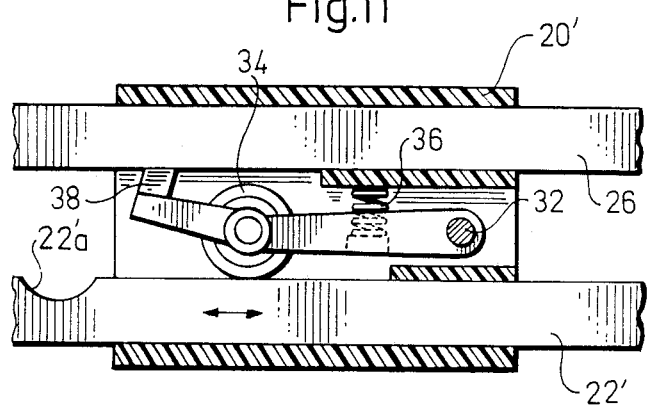
Figure 12:
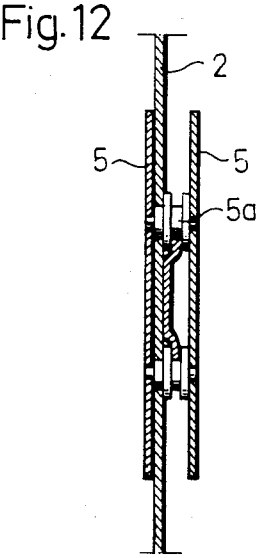

The mechanism incorporated in each of the holding means 19' and 20' is illustrated in FIGS. 10 and 11. These Figures illustrate solely the upper holding means 20'.

Arranged in the holding means 20' is a latching element 30 pivotally mounted on a pivot 32. The latching element carries a latching means in the form of a small ball bearing 34, which in the position illustrated in FIG. 10 engages a recess 22'a of corresponding radius in the guide bar 22'. The latching element is urged downwardly by means of a spring 36 and has a rubber pad 38 arranged on the end thereof remote from the pivot 32.

Figure 6:
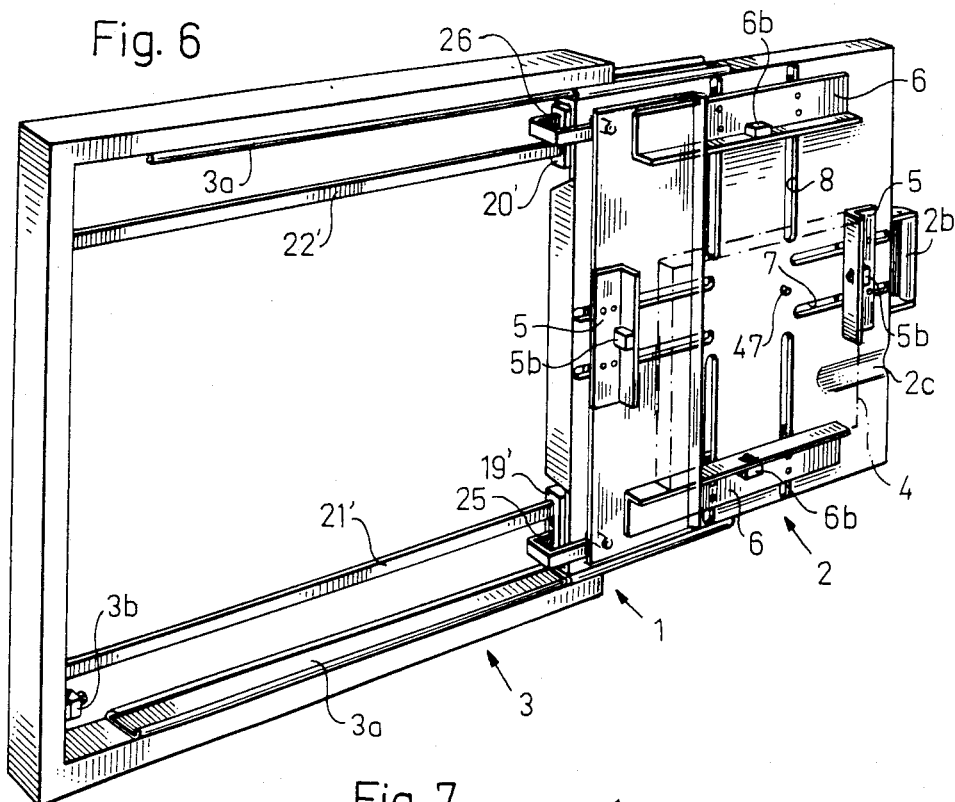
FIG. 6 is a perspective front view of another embodiment.
Figure 9:
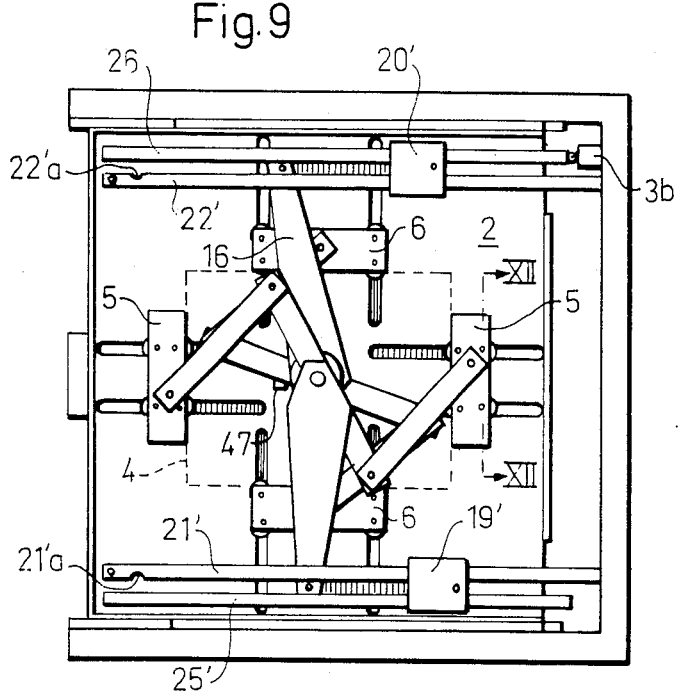
FIG. 9 is a rear view of the embodiment illustrated in FIGS. 6-8, showing the holder in the filmexposure position.

Upon movement of the holder from the position illustrated in FIGS. 6 and 7 to the position illustrated in FIG. 8, the ball bearing 34 is located in the recess 22'a in the guide bar 22', wherewith the holding means 20' is detachably connected to said guide bar, i.e. is immovable relative to the holder. In the holder position illustrated in FIG. 8, however, a change takes place in the movement state of the holding means 20' when the force transferred to the holding means via the drive link 18 exceeds a given value. Thus, when this force is exceeded the ball bearing 34 moves up, out of the recess 22'a, wherewith the latching element 30 swings upwardly at the same time, so that the rubber pad 38 engages the guide bar 26, which is movable together with the holder. The holding means 20' will then accompany the movement of the guide bar 26 instead, the ball bearing 34 rolling on the bar 22', until the terminal position shown in FIG. 9 is reached.

When the holder is returned to the cassette-change position, the sequence of movements and events is repeated in reverse order, wherewith in the position illustrated in FIG. 8, the ball bearing 34 returns to the recess 22'a, whereupon engagement of the rubber pad 38 with the guide bar 26 ceases, so that the holding means 20' is held relative to the stationary guide bar 22' and the continued movement of the holder is, instead, transferred to the dogging means 6, via the drive link 18, the drive arm 16 and associated link mechanisms, to decenter the cassette 4 in the Y-direction. The sequence is then immediately repeated for the holding means 19', causing the cassette to be decentered in the X-direction, by movement of the dogging means away from one another.

Figure 13A:
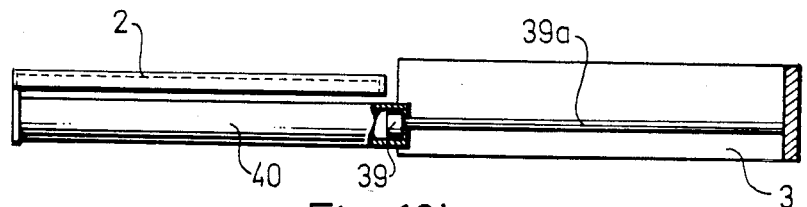
FIGS. 13a-13c are schematic side views illustrating various alternatives of restricting or dampening movement of the holder.
Figure 13B:
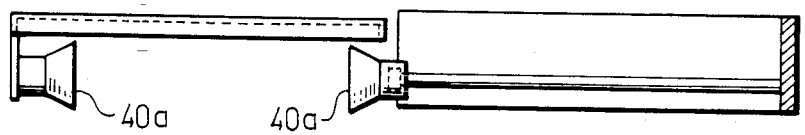
Figure 13C:
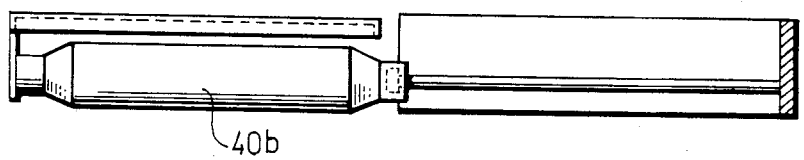

FIGS. 13a–13c illustrate alternative embodiments for restricting or damping movement of the holder 2.

In the embodiment illustrated in FIG. 13a, the holder 2 is provided with a cylinder 40 having arranged therein a piston 39, the piston rod 39a of which is mounted to the frame 3. The flow of air through the cylinder is regulated by the gap between the piston 39 and the cylinder 40. The same damping effect is achieved throughout the whole of the movement.

In the alternative embodiment illustrated in FIG. 13b, damping is only effected at the terminal positions, namely progressively in the conical cylindrical parts 40a.

FIG. 13c illustrates a further alternative embodiment corresponding to that shown in FIG. 13b, in which a certain amount of damping is effected during movement in the cylinder 40b of larger diameter.

Figure 14:
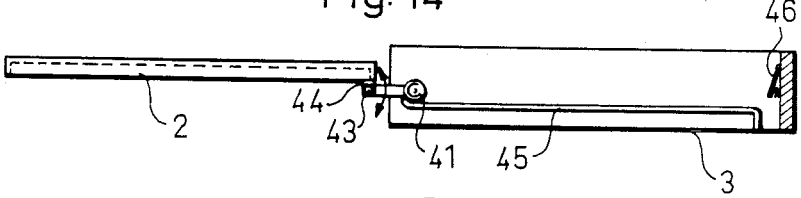
FIG. 14 is a schematic side view illustrating an embodiment for damping movement of the holder in its terminal positions and to then automatically position the holder in the film-exposure position.
Figure 15:
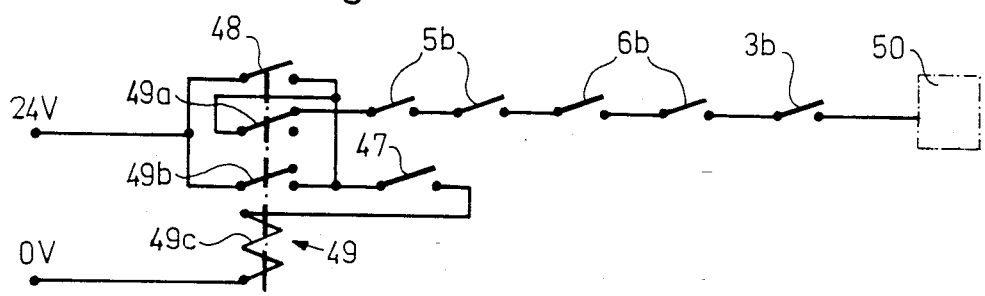
FIG. 15 illustrates schematically an arrangement of switches by means of which double-exposures can be prevented.

FIG. 14 illustrates schematically an embodiment in which movement of the holder is dampened in the terminal position, whereafter the holder is automatically positioned in the film-exposure position. In this embodiment, a wheel 41 is attached to the holder 2 and is capable of pivoting in the direction of the arrow through the agency of a torsion or worm spring 44. The wheel 41 is therewith pressed against a horizontal guide 45 in the frame 3.

When the holder 2 is moved to the film-exposure position, to the right in FIG. 14, its one end edge will strike against a sprung abutment 46, or an abutment made of an elastic material, immediately before the wheel 41, activated by the spring 44, begins to follow the vertical part of the guide 45. This causes the holder 2 to be drawn further to the right, thereby ensuring that the holder is located in the correct film-exposure position.

As will be seen from FIG. 6, each dogging means 5 and 6 is provided with a centrally arranged micro-switch 5b, 6b, these micro-switches suitably being connected together in series. In addition, the frame 3 has an additional micro-switch 3b, which is suitably connected in series with the micro-switches of the dogging means are connected. This seriesconnected circuit prevents exposure of the film should there be no cassette in the holder or should the cassette be wrongly positioned or the holder located short of the film-exposure position.

A micro-switch 47 is also arranged in the plane of the holder for the abutment surface of the cassette 4. The distance of the micro-switch from the centre of the holder is shorter than the smallest cassette used.

FIG. 16 is a circuit diagram illustrating a suitable manner of avoiding double-exposures with the aid of the aforementioned micro-switches 3b, 5b, 6b and 47. In addition, there is provided a separate micro-switch for initiating the exposure of the film.

In the illustrated arrangement the micro-switch 47 and the switch 48 for initiating film-exposure together create self-holding over a relay 49, via a relay contact 49b and a relay coil 49c, the relay making and the relay contact 49a braking for further exposure via the voltage supply to the X-ray generator 50, provided that the cassette activates the micro-switch 47.

When a cassette is changed, the micro-switch 47 brakes the self-holding of the relay 49, thereby enabling a further exposure to be made, provided that the micro-switches 5b and 6b for centering the cassette in the X-direction and Y-direction respectively and the micro-switch 3b activated by the holder in the film-exposure position are closed.

If the voltage pulse supplied to the X-ray generator 50 via the exposure switch 48 is too short, the relay 49 can be provided, in a known manner, with an operation delay.

A transparent pocket (not shown) made of an acrylic plastic and folded to one side when an exposed cassette is removed and a new cassette inserted can be arranged in front of the dogging means 5, 6, the cassette being held in position by said pocket until the cassette is held by the dogging means. To facilitate removal of the cassette, the holder may be provided with recesses 2c where the cassette is inserted.

The micro-switches 3b, 5b, 6b and 47 can be replaced with other types of switches, for example optical electrical switches.

Instead of the cassette 4 there can be used some other kind of X-ray radiation receiver. In the claims, the term "X-ray film cassette" is meant to encompass such other radiation receivers. For example, there can be used so-called image plates having the same external dimensions as X-ray film cassettes and capable of absorbing X-ray radiation corresponding to an X-ray image used for electronic image storing purposes.

IINDUSTRIAL APPLICATION

An assembly comprising a Potter-box having a holder or Potter-spade of the aforedescribed kind can be used in existing X-ray equipment and in newly manufactured X-ray equipment. In the former case, it is a comparatively simple matter to first remove the corresponding unit used and then mount a new assembly constructed in accordance with the present invention.

In the aforegoing, the invention has been described with reference to a holder or Potter-spade arranged for rectilinear movement. It will be understood by one of normal skill in this art that the invention can be equally as well applied with an assembly comprising a holder which can be rotated or swung about an axis, and that only minor modifications need be carried with regard to the link system transferring the movement of the holder to the drive means effective in producing the centering and decentering movements of the dogging means.

I claim:

1. A holder for an X-ray film cassette, said holder being linearly movable between two terminal positions, a cassette change position and a film-exposure position, relative to a frame, and which holder is provided with pairs of dogging means for centering the cassette in a first direction parallel to the linear movement and a second direction transverse thereto, and a linking means for linking each pair of dogging means to a respective independent drive means coupled to said frame, and said linking and drive means displacing respective dogging means between a cassette decentering position when said holder is at the cassette terminal position and a centering position when at the other terminal position, irrespective of the dimensions of the cassette, characterized in that the drive means of the linking means are arranged to drive respective pairs of dogging means in said first and second directions based upon the movement of the holder between said terminal positions, each pair of dogging means is provided with a respective micro-switch means, serially connected, for inhibiting exposure of said film in the absence of the cassette in the holder or in the unsatisfactory centering of the cassette therein, said respective micro-switch means connected in series with a further micro-switch means disposed in the frame for sensing when the holder is not located in its terminal film-exposure position and for inhibiting the exposure of said film.

2. A holder according to claim 1, characterized by means for storing energy during at least part of the linear movement of the holder to one of the terminal positions in which energy is used to facilitate movement of the holder in the opposite direction, and a releasable latching means for detachably fixing the holder in the energy-absorbing position of the energy storing means, to permit latching at one of said terminal positions.

3. A holder according to claim 1, characterized by means for damping at least part of the linear movement of the holder in one or both directions at least at the terminal positions thereof.

4. A holder according to claim 1, characterized by means for ensuring automatic positioning of the holder to the film-exposure terminal position.

5. A holder according to claim 1, characterized in that both said respective micro-switch means co-act with a further switch placed in a plane of the holder adjacent an abutment surface of the cassette at a distance from the center of the holder which is shorter than the smallest cassette, and a relay for blocking a second exposure of the X-ray film until the further micro-switch in the plane of the holder has been deactivated.

6. A holder according to claim 1 including a controllable motor-driven linear drive means for moving said holder between said cassette change terminal position and said film-exposure terminal position whereby said cassette is centered due to respective drive and linking means moving respective pairs of dogging means in said first and second directions when said holder is moved to said film-exposure terminal position.

7. A holder according to claim 1 wherein said frame includes first and second supports and said holder includes complementary first and second sliding members which ride over respective supports, said means for centering centers said cassette simultaneously in both said first and said second directions and said pairs of dogging means includes a first dogging pair and a second dogging pair, the respective linking means and drive means include a first and a second linking and drive means coupled respectively to said first and second dogging pairs, said first and second drive means respectively coupled to said first and second sliding members whereby centering occurs in said first direction independent and distinct from centering in said second direction due to the independent operation of said first sliding member, first drive means, first linking means and first dogging pair as compared with the independent operation of said second sliding member, second drive means, second linking means and second dogging pair.

* * * * *